US005173716A

United States Patent [19]

Tetsuka

[11] Patent Number: 5,173,716

[45] Date of Patent: Dec. 22, 1992

[54] DEVICE FOR DRIVING TELESCOPIC POWER ANTENNA

[75] Inventor: Kiyoshi Tetsuka, Tokyo, Japan

[73] Assignee: Harada Kogyo Kabushiki Kaisha, Tokyo, Japan

[21] Appl. No.: 649,651

[22] Filed: Feb. 1, 1991

[30] Foreign Application Priority Data

Feb. 2, 1990 [JP] Japan ................................ 2-9027[U]

[51] Int. Cl.[5] ..................... H01Q 1/100; F16D 3/120; F16D 3/660; F16D 3/680

[52] U.S. Cl. ..................................... 343/903; 464/61; 464/160

[58] Field of Search .................... 74/138, 139; 464/23, 464/61, 160; 343/715, 901, 902-903, 766

[56] References Cited

U.S. PATENT DOCUMENTS

| | | | |
|---|---|---|---|
| 446,123 | 2/1891 | Pyle | 464/61 |
| 1,522,774 | 1/1925 | Foote | 464/61 |
| 3,922,884 | 12/1975 | Chapman | 464/160 |
| 4,770,055 | 9/1988 | Chevance et al. | 464/160 |
| 4,864,322 | 9/1989 | Yamamoto et al. | 343/715 |

FOREIGN PATENT DOCUMENTS

| | | | |
|---|---|---|---|
| 0120428 | 5/1989 | Japan | 464/61 |
| 8303715 | 10/1983 | World Int. Prop. O. | 343/715 |

*Primary Examiner*—Rolf Hille
*Assistant Examiner*—Peter Toby Brown
*Attorney, Agent, or Firm*—Koda and Androlia

[57] ABSTRACT

A device for driving telescopic power antenna for vehicles including a drive cylinder connected to an antenna motor, a driven cylinder which is concentrical with the drive cylinder and controls the extension and retraction of the antenna when rotated by the drive cylinder, and a transmisson mechanism interposed between the drive an driven cylinders. The transmission mechanism includes a projection formed on the drive cylinder, a circular groove formed on the driven cylinder, a coil spring installed in a manner to expand and contract in the direction of the length of the groove, and a pair of arc shaped cores installed in the coil spring. The coil spring and the cores ae compressed by a specific displacement-pressure relationship when the projection moves along the groove and presses one end of the coil spring when a relative rotation occurs between the drive and driven cylinders.

1 Claim, 1 Drawing Sheet

DEVICE FOR DRIVING TELESCOPIC POWER ANTENNA

DETAILED DESCRIPTION OF THE INVENTION

1. Field of the Invention

The present invention relates to a device for driving a telescopic power antenna which is suitable to be used for a telescopic antenna for automobiles, etc.

2. Prior Art

In electrically driven telescopic antennas installed on automobiles, etc., the antenna element is extended and retracted when an antenna motor is rotated in forward and reverse directions, respectively. When the antenna completes its extension or retraction, the antenna ceases its movement, making no further movement. This results in a large load abruptly applied to the motor. If the motor is left as is in this state, an excessive current will flow in the motor coils, burning the coil wires, etc. In order to prevent this, a clutch mechanism is utilized between the antenna motor and the antenna. This clutch mechanism includes clutch plates which are in a pressure contact with each other so that the clutch plates can slide relative to each other. When the extension or retraction of the antenna is completed, the clutch plates are caused to slip to each other, thus temporarily releasing the coupling between the motor side and the drive side.

Problems to Be Solved by the Present Invention

In the clutch mechanism as constructed above, a large noise is usually generated during the slippage of the clutch plates. In addition, the wear of the clutch plates is severe, and the clutch pressure drops remarkably within a relatively short period of time. As a result, the rotary force from the drive side to the driven side is not stably transmitted over a long period of time. Thus, the clutch mechanism lacks reliability.

The object of the present invention is to provide a simple mechanism for an electrically driven telescopic antenna, wherein it is possible to avoid burning of motor coil wires, etc., by alleviating abrupt load increase that would occur when the antenna element completes its extension and retraction, wherein it is possible to constantly transmit the rotary force from the drive side to the driven side over a long period of time, and wherein no slipping noise of the clutch plates, etc. would occur.

Means to Solve the Problem

In order to accomplish the object described above, the present invention adopts a structure as described below:

(1) A rotary force transmission mechanism is interposed between an antenna drive-side base and an antenna driven-side base. The rotary force transmission mechanism comprises: a groove which is formed in a circumferential direction on one of the facing surfaces of the two bases [e.g., on the surface of the driven-side base], a coil spring installed in a specified area of the groove so that the spring can expand and contract in the direction of the length of the groove, and a projection which is formed on the other surface of the facing surfaces of the two bases [e.g., on the surface of the drive-side base], so that the projection causes a compressive deformation of the coil spring when a relative rotation occurs between the drive-side base and the driven-side base.

(2) In the mechanism described above, elastic cores made of rubber, etc., are installed inside the coil spring, and the coil spring and elastic cores are arranged so that they are caused to undergo compressive deformation by a specific displacement-pressure relationship made by the movement of the projection when a relative rotation occurs between the drive-side base and the driven-side base.

Function

As a result of the construction thus adopted, the device has the following advantages:

(1) Since the rotary force transmission mechanism is constructed so that the drive-side rotary force is transmitted to the driven-side via a coil spring which is installed between the drive-side base and the driven-side base, during the extension or retraction of the antenna element, the rotary force of the drive-side base is transmitted to the driven-side base with the coil spring in somewhat a compressed state, and the extension or retraction of the antenna element is accomplished as a result of this transmission of the rotary force. As a result, the drive-side rotary force can be transmitted stably to the driven-side over a long period of time unlike the conventional clutch mechanism. Meanwhile, when the extension or retraction of the antenna element is completed, the driven-side base, which is coupled to the antenna element, immediately stops its rotation, but the drive-side base, which is directly connected to the motor, stops its rotation slightly after making a few rotations by way of the moment of inertia that further compresses the coil spring. As a result of this action, the moment of inertia of the drive-side (including the motor) is absorbed, and the shock that occurs when the rotation stops is alleviated. This means that abrupt load increase on the motor is also alleviated. In this case, as a result of the special nature of the coil spring, it is assured that the increase in the spring pressure relative to the amount of displacement will be comparatively mild. Accordingly, a sufficient buffering effect can be obtained, and there is no slipping noise generated because there is no slippage of clutch plates.

If the completion of the extension or retraction of the antenna is detected by a detection means so that the motor power supply is cut off while the buffering action is being performed, burning of the motor coil wires, etc., is avoided.

(2) In addition, according to the present invention, the elastic resilience of the coil spring acts in appropriate combination with the elastic resilience of the elastic cores which are made of rubber, etc. As a result, the rotary force applied during the extension or retraction of the antenna element and the elastic resilient force used for buffering the shock that occurs when the extension or retraction of the antenna element is completed can be set with a good balance in a prescribed state using a simple mechanism.

EMBODIMENT

FIG. 1 is a cross sectional view of one embodiment of the present invention, and FIG. 2 is a cross sectional view taken along the line II—II of FIG. 1.

As shown in FIGS. 1 and 2, this telescopic power antenna driving device of the present invention includes a disk-shape drive-side base 10 which is caused to rotate by the motive force of an antenna motor (not shown), a disk-shape driven-side base 20 which is concentric with the drive-side base 10 and extends and retracts an antenna element (not shown) when rotated, and a rotary force transmission mechanism 30 which is interposed between the drive-side base 10 and the driven-side base 20 so as to transmit the rotary force of the drive-side base 10 to the driven-side base 20.

The drive-side base 10 is a single integral unit formed by a material such as a hard synthetic resin, etc. The base 10 has a tube part 11 at the center and a gear part 12 formed around the outer circumference. The gear part 12 engages with a worm gear G installed on a motor shaft. A projection 31, which is one of the elements of the rotary force transmission mechanism 30, is formed on the surface of the drive-side base 10. The surface with the projection 31 formed thereon faces the driven-side base 20.

As seen in FIG. 2, the projection 31 has two arc-shaped pressing parts 31*a* and 31*b* at both ends of a main-body 31*c*. The pressing parts 31*a* and 31*b* are of less thickness than the main body 31*c*. The projection 31 causes compressive deformation of a coil spring 35 (described below) when a relative rotation occurs between the drive-side base 10 and driven-side base 20.

The driven-side base 20 is also a single integral unit formed by a material such as a hard synthetic resin, etc. The base 20 has a tube part 21 at the center and a gear part 22 around its outer circumference. The gear part 22 engages with the rack R of a rack-rope L which feeds the antenna element (not shown). A groove 32, which is also one of the elements that make the rotary force transmission mechanism 30, is formed on the surface of the driven-side body 20 along the circumference thereof. The surface with the groove 32 formed thereon faces the drive-side base 10.

As shown in FIG. 2, the groove 32 is in a ring shape, and projecting walls 33 and 34 are formed at two intermediate points of the groove 32.

In a specified area of the groove 32, i.e., in an area located between the projecting walls 33 and 34 (which is shown in the right side half of FIG. 2), a coil spring 35 is installed in a somewhat compressed condition. The coil spring 35 can expand and contract in the direction of the length of the groove 32 and is compressed and thus deformed by the projection 31 when a relative rotation occurs between the drive-side base 10 and the driven-side base 20.

Inside the hollow space of the coil spring 35, a pair of elastic cores 36*a* and 36*b* both made of rubber, etc., are installed. Each of these elastic cores 36*a* and 36*b* has a flange 37*a* and 37*b*, respectively, at one end. The flanges 37*a* and 37*b* are provided so as to make a stable striking contact with the pressing parts 31*a* and 31*b* of the projection 31. Thus, the elastic cores 36*a* and 36*b* are provided so that the flange parts 37*a* and 37*b* are at the ends of the coil spring 35 and the tail ends of the cores face each other with a prescribed space in between.

As a result, the coil spring 35 and elastic cores 36*a* and 36*b* are arranged so that they are caused to undergo compressive deformation in accordance with a movement of the projection 31 that is caused by a relative rotation between the drive-side base 10 and the driven-side base 20.

In the following is described the operation of the driving device.

When the antenna motor (not shown) is rotated in the forward direction to extend the antenna element, the worm gear G rotates in the forward direction and thus the drive-side base 10 is rotated. As a result, the projection 31 rotates in the direction shown by the solid-line arrow in FIG. 2 and the pressing part 31*a* of the projection 31 strikes the flange 37*a* of the elastic core 36*a*, rotating the elastic core 36*a* in the counterclockwise direction in FIG. 2. As a result of this rotation, the coil spring 35 undergoes compressive deformation. When the amount of this compressive deformation reaches a prescribed level, the rotary force of the drive-side base 10 is transmitted to the driven-side base 20 as a sufficient rotary force. When this transmitted rotary force exceeds the magnitude of the load on the antenna element coupled to the driven-side base 20, the driven-side base 20 rotates together with the drive-side base 10. As a result, the rack-rope L moves upward as shown by the solid-line arrow in FIG. 2, causing the antenna element to extend.

When the extension of the antenna is completed, the movement of the rack-rope L is stopped. As a result, the driven-side base 20 can no longer rotate, and therefore, stops its rotation at this position. Meanwhile, the drive-side base 10, which is directly connected to the antenna motor, attempts to continue its rotation as a result of its moment of inertia, and the pressing part 31*a* of the projection 31 compresses the coil spring 35 even further. In the process of this compression, the tail end of the elastic core 36*a* comes into contact with the tail end of the elastic core 36*b*, and the drive-side base 10 rotates slightly while the elastic cores 36*a* and 36*b* (which are in contact) and the coil spring 35 are further compressed by the pressing part 31*a* of the projection 31, and then the drive-side base 10 stops. The completion of the extension or retraction of the antenna is detected by an appropriate detection means, and the motor power supply is cut off while the action of absorbing the moment of inertia is being performed.

When the motor is rotated in the reverse direction in order to retract the antenna element, the worm gear G rotates in the reverse direction and the drive-side base 10 is rotated in the reverse direction. As a result, the projection 31 rotates in the direction shown by the broken-line arrow in FIG. 2 and the pressing part 31*b* of the projection 31 strikes the flange part 37*b* of the elastic core 36*b*. As a result of this action, the elastic core 36*b* rotates in a clockwise direction in FIG. 2. When this rotation occurs, the coil spring 35 undergoes a compressive deformation, and the driven-side base 20 is rotated together with the drive-side base 10. As a result, the rack-rope L is moved downward as indicated by the broken-line arrow in FIG. 2, thus causing the antenna to retract.

When the retraction of the antenna element is completed, the driven-side base 20 stops immediately (as in the same manner as antenna extension), while the drive-side base 10 rotates slightly further so as to compress and deform the coil spring 35 and elastic cores 36*a* and 36*b*, causing a further compressive deformation and then stops. Then, the motor power supply is cut off as in the case of antenna element extension.

The present invention offers the advantages as described below:

In particular, the mechanism of the present invention is constructed so that the rotary force of the drive side is transmitted to the driven side via a coil spring 35 which is interposed between the drive-side base 10 and the driven-side base 20.

Accordingly, during the extension and retraction movement of the antenna element, the rotary force is transmitted from the drive-side base 10 to the driven-side base 20 with the coil spring 35 in a somewhat compressed state, and the antenna element is extended or retracted by the transmission of this rotary force. Thus, the rotary force of the drive side can be steadily transmitted to the driven-side over a long period of time, which is not true in cases where conventional clutch elements are used.

Meanwhile, when the extension and retraction movement of the antenna element is completed, the driven-side base 20, which is coupled to the antenna element, immediately stops its rotation. However, the drive-side base 10, which is connected to the antenna motor compresses and deforms the coil spring further so as to rotate slightly further as a result of its moment of inertia, and then stops. As a result of this action, the moment of inertia of the drive-side (including the antenna motor) is absorbed, and the shock that occurs when the rotation stops is alleviated. This means that the abrupt increase in the load on the motor is also alleviated. In this case, because of particular nature of the coil spring 35, it is possible to reduce the increase in spring pressure relative to the amount of displacement. As a result, a sufficient shock-absorbing effect is obtained. Thus, according to the present invention, an action that corresponds to a clutch plate slippage does not occur at all. As a result, slipping noise, etc. will not be generated. Also, the completion of the antenna extension and retraction is detected by a detection means, and the motor power supply is cut off while the action absorbing the moment of inertia is being performed. Accordingly, burning of the motor coil wires, etc., due to an excessive load can be avoided.

Furthermore, the elastic resilient force of the coil spring 35 and the elastic resilient force of the elastic cores **36*a* and 36*b*** which are made of rubber, etc., can act in a combination. As a result, the rotary force applied during the extension or retraction of the antenna element and the elastic resilient force used to absorb the shock that occurs when the extension and retraction of the antenna element is completed can be set at a good balance of a desired state with a simple mechanism.

The present invention is not limited to the embodiment described above. It goes without saying that various modification are possible within the spirit of the invention.

Effect

The device of the present invention is constructed so that the rotary force of the drive side is transmitted to the driven side via a coil spring which is interposed between the drive-side base and the driven-side base. Accordingly, the present invention provides an antenna drive device of a simple structure which is suitable to be used for an electrically driven telescopic antenna: in which the abrupt load increase that occurs when the extension and retraction of the antenna element is completed is alleviated, thus avoiding burning of the motor coil wires, etc.; in which the rotary force can be transmitted from the drive-side to the driven-side constantly over a long period of time; and in which absolutely no clutch plate slipping noise, etc. occurs.

Figure 1:
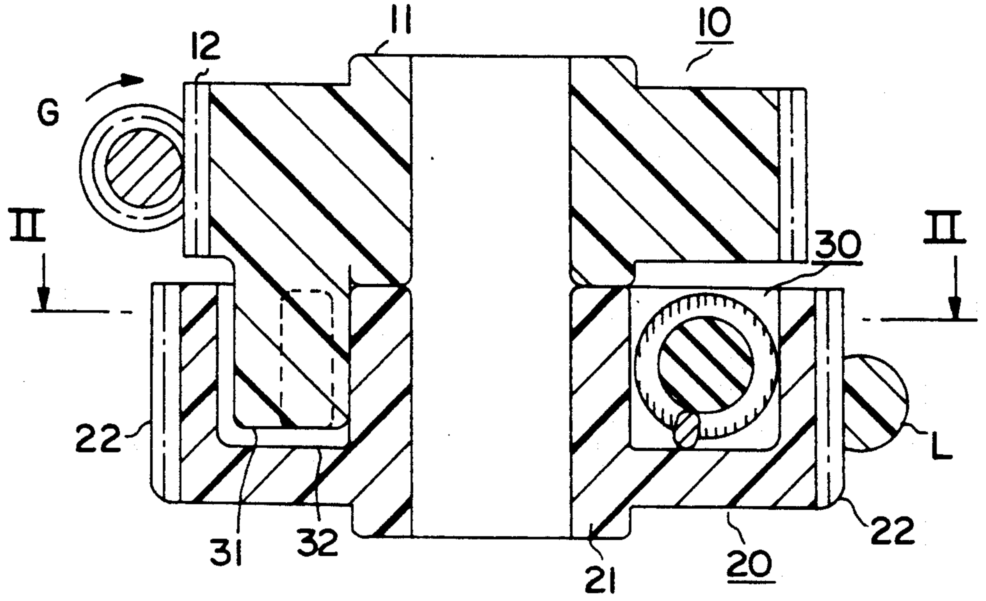
FIG. 1 is a cross sectional view of one embodiment of the present invention.
Figure 2:
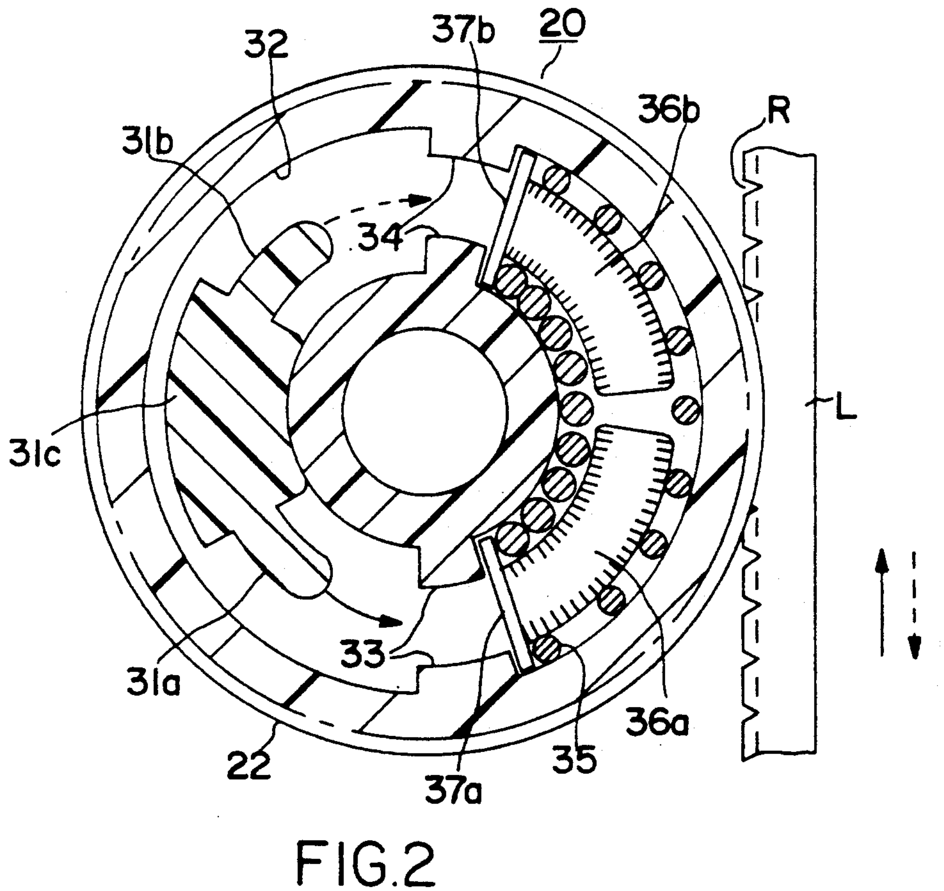
FIG. 2 is a cross sectional view taken along the along line II—II of FIG. 1.

I claim:

1. A device for driving a telescopic power antenna characterized in that said device includes: a disk-shape drive-side base which is caused to rotate by a motive force of a motor; a disk-shape driven-side base which is concentrically provided adjacent to the drive-side base and causes an antenna element to extend and retract when rotated; and a rotary force transmission mechanism interposed between the drive-side base and the driven-side base to transmit a rotary force of the drive side base to the driven-side base, said rotary force transmission mechanism comprising a groove formed in a circumferential direction on one of facing surfaces of said two bases, a coil spring installed in a specific area of the groove so that the coil spring expands and contracts in the direction of the length of the groove, and a projection formed on the other of the facing surfaces of the two bases so as to cause a compressive deformation of the coil spring when a relative rotation occurs between the drive-side base and the driven-side base; and wherein elastic cores made of rubber are installed in an internal hollow space of the coil spring, said coil spring and elastic cores being arranged so that they are caused to undergo compressive deformation by a specific displacement-pressure relationship made by the movement of the projection when a relative rotation occurs between the drive-side base and the driven-side base.

* * * * *